(12) United States Patent
Perciballi et al.

(10) Patent No.: US 7,938,485 B1
(45) Date of Patent: May 10, 2011

(54) VARIABLE DISPLACEMENT SEATING ASSEMBLY

(75) Inventors: William Joseph Perciballi, Phoenix, AZ (US); Richard F. Langner, Scottsdale, AZ (US); Joshua Kevin Platt, Phoenix, AZ (US); Sean Joseph Murphy, Gilbert, AZ (US)

(73) Assignee: Armorworks Enterprises, LLC, Chandler, AZ (US)

( * ) Notice: Subject to any disclaimer, the term of this patent is extended or adjusted under 35 U.S.C. 154(b) by 290 days.

(21) Appl. No.: 12/384,061

(22) Filed: Mar. 31, 2009

Related U.S. Application Data

(60) Provisional application No. 61/205,060, filed on Jan. 14, 2009.

(51) Int. Cl.
| | |
|---|---|
| *B60N 2/01* | (2006.01) |
| *B60N 2/04* | (2006.01) |
| *B60N 2/10* | (2006.01) |
| *B60N 2/24* | (2006.01) |
| *B60N 2/30* | (2006.01) |
| *B60N 2/42* | (2006.01) |
| *B60N 2/427* | (2006.01) |
| *B60R 21/00* | (2006.01) |

(52) U.S. Cl. ............ 297/216.1; 297/216.16; 297/216.17; 297/248; 297/331; 297/334; 297/335; 297/440.15; 297/440.16

(58) Field of Classification Search .................. 297/331, 297/334, 335, 216.1, 216.13, 216.15, 216.16, 297/216.17, 248, 440.15, 440.16, 440.21
See application file for complete search history.

(56) References Cited

U.S. PATENT DOCUMENTS

| | | | | |
|---|---|---|---|---|
| 3,968,863 A * | 7/1976 | Reilly | ................... | 297/216.1 X |
| 5,700,058 A * | 12/1997 | Balagurumurthy et al. | ........................ | 297/440.15 |
| 6,296,291 B1 * | 10/2001 | Lansinger | ............ | 297/216.13 X |
| 6,378,939 B1 * | 4/2002 | Knoll et al. | ............... | 297/216.1 |
| 6,394,393 B1 * | 5/2002 | Mort | ................... | 297/216.17 X |
| 6,585,190 B2 * | 7/2003 | Mort | ................... | 297/216.17 X |
| 6,742,841 B1 * | 6/2004 | Soditch et al. | ............... | 297/335 |
| 7,040,702 B2 * | 5/2006 | Yamada et al. | ............... | 297/331 |
| 7,077,463 B2 * | 7/2006 | Sun et al. | .................. | 297/334 X |
| 7,086,696 B2 * | 8/2006 | Yudovich | ..................... | 297/335 |
| 7,201,425 B2 * | 4/2007 | Tsujibayashi et al. | ..... | 297/335 X |
| 7,252,320 B2 * | 8/2007 | Tsujibayashi et al. | ..... | 297/335 X |
| 7,293,835 B2 * | 11/2007 | Yudovich | ..................... | 297/335 |
| 7,374,242 B2 * | 5/2008 | Champ et al. | ................ | 297/331 |
| 7,387,333 B2 * | 6/2008 | Seibold | ......................... | 297/334 |
| 7,445,181 B2 * | 11/2008 | Knoll et al. | .......... | 297/216.17 X |
| 7,452,033 B2 * | 11/2008 | Ma et al. | ................... | 297/336 X |
| 7,581,793 B2 * | 9/2009 | Hartmann et al. | ........ | 297/334 X |
| 7,744,152 B2 * | 6/2010 | Seibold | ...................... | 297/334 X |
| 7,753,443 B2 * | 7/2010 | Uchida | .................. | 297/216.1 X |
| 7,758,129 B2 * | 7/2010 | Maruno et al. | ........ | 297/440.15 X |
| 7,901,005 B2 * | 3/2011 | Khan et al. | ..................... | 297/331 |
| 2004/0032155 A1 * | 2/2004 | Yamada et al. | ................ | 297/331 |
| 2006/0138836 A1 * | 6/2006 | Yudovich | ..................... | 297/335 |

* cited by examiner

*Primary Examiner* — Rodney B White
(74) *Attorney, Agent, or Firm* — Schwartz Law Firm, P.C.

(57) ABSTRACT

A variable displacement seating assembly incorporates at least first and second pivotable seat frames. The first seat frame includes a male seat connector. The second seat frame is arranged adjacent the first seat frame, and includes a female seat connector receiving the male seat connector of the first seat frame. The first and second seat frames are operatively interconnected for simultaneous pivoting movement between a stowed position and a deployed position. In the deployed position of the first and second seat frames, the male and female seat connectors are disposed for sliding vertical movement of one seat connector relative to the other, such that the first and second seat frames are independently vertically displaceable upon an impact force acting against the seat assembly.

20 Claims, 9 Drawing Sheets

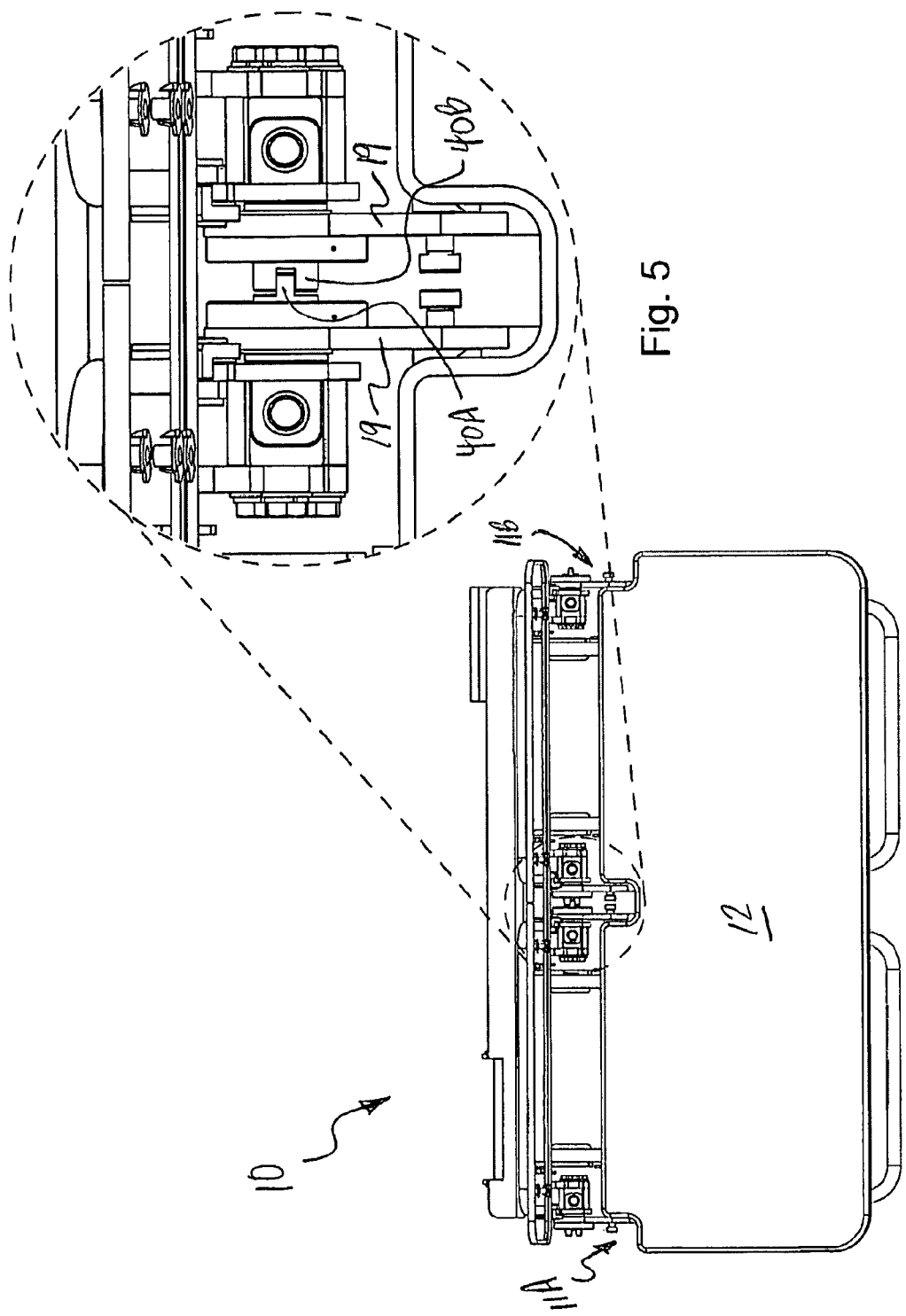

VARIABLE DISPLACEMENT SEATING ASSEMBLY

TECHNICAL FIELD AND BACKGROUND

The present disclosure relates broadly to a variable displacement seating assembly. In the various exemplary embodiments described herein, the present seating assembly is applicable for attenuating under-vehicle blast and slam-down impact utilizing energy-absorbing devices and technology. The present seating assembly may comprise, for example, a series of individual, side-by-side, low-back seats which are operatively linked together to form a unitary energy attenuating bench seat with bench seat functionality and independently responsive seat frames. Such bench seats may be used in military vehicles, such as standard infantry fighting vehicles (IFVs), and other compatible vehicles known in the industry.

The exemplary disclosure relates broadly to a variable displacement seating assembly, and which may further comprise a crashworthy, lightweight, energy attenuating seating solution. To achieve effective personnel and troop seating performance levels for varied missions, the exemplary seating assembly may address personnel/troop anthropometry, ergonomics, restraint, workload, human-seating interface issues and crash protection strategies. The exemplary disclosure may further comprise a stowable/removable personnel/troop seating assembly that offers increased protection for transported personnel/troops in full gear by attenuating impact energy during a crash pulse, and adequately restraining the personnel during roll-over events and mine blast.

In one exemplary implementation, the present seating assembly may be integrated into a seating system adapted for military aircraft, including but not limited to, fixed and rotary wing aircraft, and all ground vehicles including but not limited to, tracked wheeled vehicles of current or future designs, which function as crew and cargo transport and combat fighting vehicles. The present concept may also help reduce crash and mine blast loading on vehicle occupants thereby improving survivability of (and mitigating injury to) the occupants. For civilian use, the exemplary seating assembly may be integrated in a system adapted for civilian transportation of all types including, but not limited to, automobiles, trucks, buses, rail transport systems (trains) and commercial and civilian aircraft, ground vehicles for firefighters and other rescuer transport vehicles to help reduce crash loading on vehicle occupants, thereby improving survivability of (and mitigating injury to) the occupants.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the present disclosure comprises a variable displacement seating assembly which incorporates at least first and second pivotable seat frames. The first seat frame includes a male seat connector. The second seat frame is arranged adjacent the first seat frame, and includes a female seat connector receiving the male seat connector of the first seat frame. The first and second seat frames are operatively interconnected for simultaneous pivoting movement between a stowed position and a deployed position. In the deployed position of the first and second seat frames, the male and female seat connectors are disposed for sliding vertical movement of one seat connector relative to the other, such that the first and second seat frames are independently vertically displaceable upon an impact force acting against the seat assembly.

According to another exemplary embodiment, the male seat connector comprises a projecting lug.

According to another exemplary embodiment, the female connector comprises an open-ended groove.

In alternative embodiments, the male and female connectors may comprise any other complementary (or cooperating) structure designed to interlink multiple parts, and may further comprise complementary structure which enables substantially unimpeded vertical movement of one connector relative to the other in a vertical direction. In yet another exemplary embodiment, the male and female connectors may comprise complementary (or cooperating) structure designed to interlink multiple parts, and which may enable substantially unimpeded movement of one connector relative to the other in a first direction, while blocking movement of one connector relative to the other in a second direction.

According to another exemplary embodiment, a padded (or non-padded) bench is located over each of the first and second seat frames. All cushion material incorporated in the present seating assembly may satisfy Flammability UL 94, FMVSS-302, FAR 25.853(a) Appendix F Part 1(a) (1) (ii) (12 sec), California Flame 117, RoHS Compliant—this document being incorporated in its entirety by reference herein.

According to another exemplary embodiment, the bench has a lateral flex joint in an area between the first and second seat frames.

According to another exemplary embodiment, each of the first and second seat frames further comprises first and second spaced-apart fixed mounting brackets, a generally U-shaped seat support, and first and second pivoted mounting arms. The mounting arms extend from respective mounting brackets and are connected to respective free ends of the U-shaped seat support.

According to another exemplary embodiment, each of the fixed mounting brackets defines a slotted vertical opening, and each of the seat frames further comprises first and second displaceable mounting blocks carried on respective vertical guide rails, and received within the slotted openings of the mounting brackets. The first and second mounting arms of the seat frame are pivotably connected to the mounting blocks, such that the mounting blocks enable vertical displacement of the seat frame along respective guide rails.

According to another exemplary embodiment, the seating assembly incorporates an energy attenuating seat link having a first end connected to the displaceable mounting block and a second end connected to a base of the fixed mounting bracket. The exemplary seating assembly may incorporate one or more energy attenuating seat links per seat frame.

According to another exemplary embodiment, the energy attenuating seat link has a substantially sinusoidal design.

According to another exemplary embodiment, a base is located beneath each of the seat frames.

According to another exemplary embodiment, an intermediate pivoted tie bar extends from a front of each seat frame towards a rear of each base.

According to another exemplary embodiment, first and second fixed seat back frames are located adjacent respective seat frames.

According to another exemplary embodiment, a padded seat back is located over the fixed seat back frames.

BRIEF DESCRIPTION OF THE DRAWINGS

The description of exemplary embodiments proceeds in conjunction with the following drawings, in which:

FIG. 4 is a plan view of the exemplary seating assembly in a deployed position;

FIG. 5 is an enlargement of the circular area designated in FIG. 4;

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
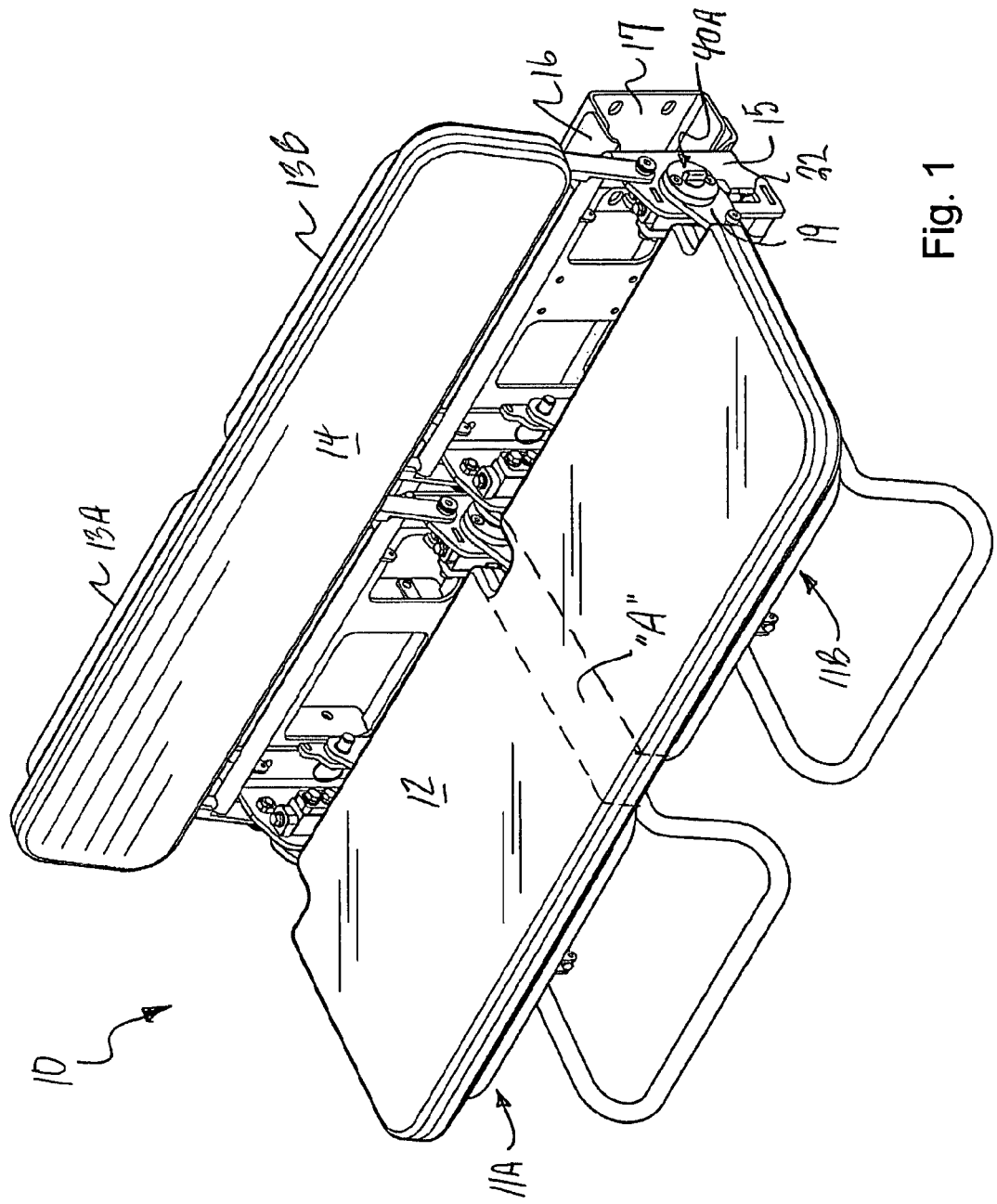
FIG. 1 is a perspective view of a variable displacement seating assembly according to one exemplary embodiment of the present disclosure.
Figure 2:
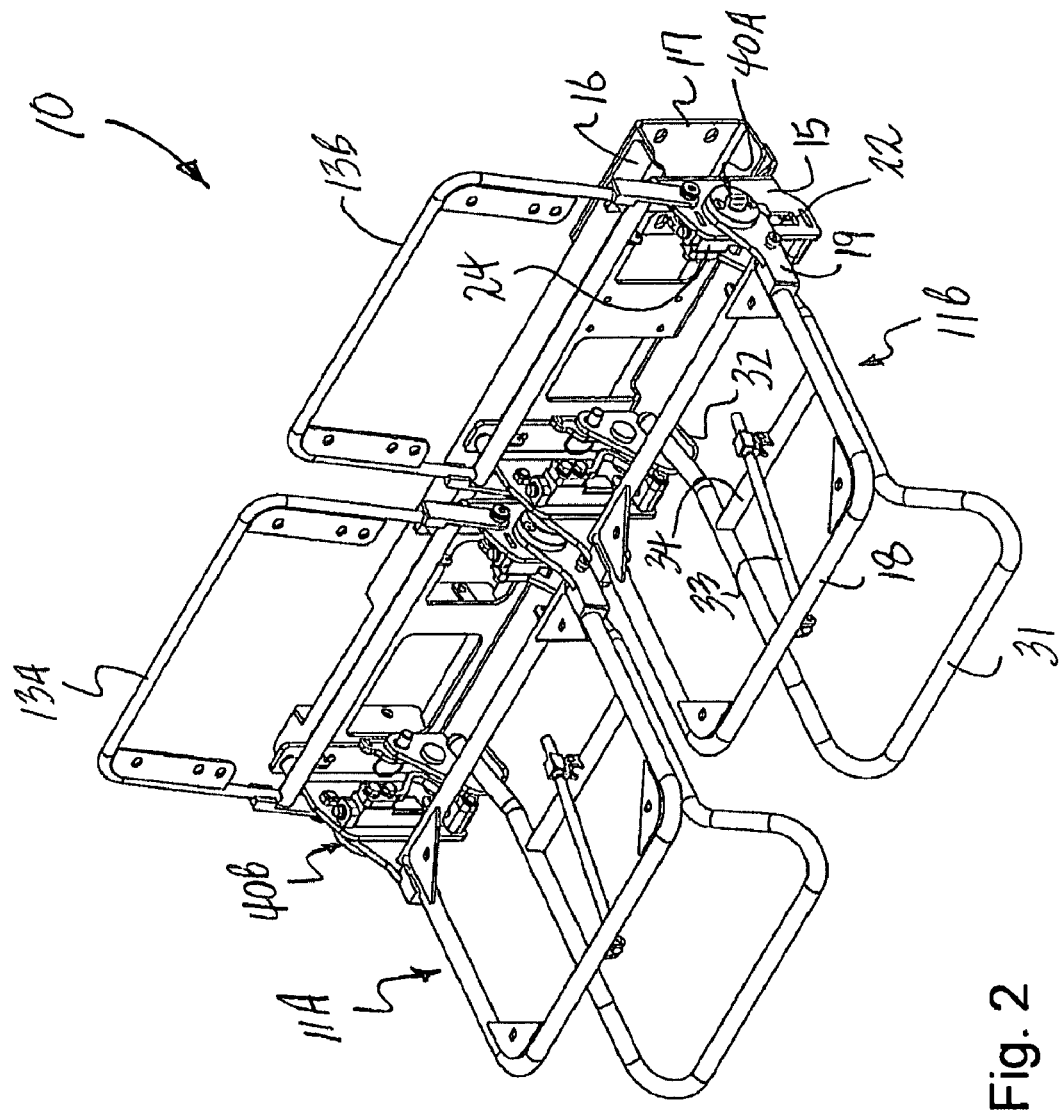
FIG. 2 is a further perspective view of the exemplary seating assembly with the seat bench removed.

Referring now specifically to the drawings, a variable displacement seating assembly according to one exemplary embodiment of the present invention is illustrated in FIGS. 1 and 2, and shown generally at reference numeral 10. The exemplary seating assembly 10 incorporates a series of two or more identical side-by-side interlinked seat frames 11A, 11B designed to react separately and independently in a sudden impact scenario, such as an under-vehicle blast caused by explosive mines or IED's (improvised explosive devices), or a vehicle slam-down occurrence. A single occupant-supporting bench 12 shown in FIG. 1 may be located over the adjacent seat frames 11A, 11B. In the exemplary embodiment, the bench 12 comprises spaced-apart internal rigid or semi-rigid reinforcing seat boards (not shown) arranged to separately cover each seat frame. The seat boards are separated between the seat frames 11A, 11B by a flexible area "A" of foam and fabric; this area defining a lateral flex joint designed to facilitate independent vertical displacement of one seat frame 11A relative to the other 11B, as described below. The seating assembly 10 may further incorporate quick-release multi-point restraints (not shown) which conform to load requirements of Federal Motor Vehicle Safety Standards (FMVSS) 209 and 210—these standards being incorporated by reference herein. The restraints function to separately secure and properly locate the vehicle occupants on the padded bench 12 relative to respective underlying seat frames 11A, 11B of the seating assembly 10. The seat assembly 10 may also comprise independent seat back frames 13A, 13B covered by a single padded seat back 14. The exemplary disclosure is applicable to occupant seating in any land, air, and sea vehicle.

Referring to FIG. 2, each seat frame 11A, 11B comprises spaced-apart fixed mounting brackets 15 formed with (e.g. by welding) a substantially horizontal C-shaped assembly mounting channel 16. The assembly mounting channel 16 is welded to and cooperates with a similar but opposing C-shaped channel 17 and appropriate hardware to fixedly mount the seating assembly 10 to the vehicle. Additionally, each seat frame 11A, 11B has a generally U-shaped seat support 18 formed with first and second pivoted mounting arms 19. The pivoted mounting arms 19 extend from respective fixed mounting brackets 15, and are connected to respective free ends of the U-shaped seat support 18. Each of the fixed mounting brackets 15 defines a slotted vertical opening 22 enabling direct connection of the pivoted mounting arm 19 to a displaceable mounting block 24 on opposite sides of the mounting bracket 15. The pivoted mounting arms 19 and displaceable mounting blocks 24 cooperate, as discussed below, to allow pivoting movement of the seating assembly 10 and independent variable displacement of one seat frame 11A relative to the other 11B.

Figure 3:
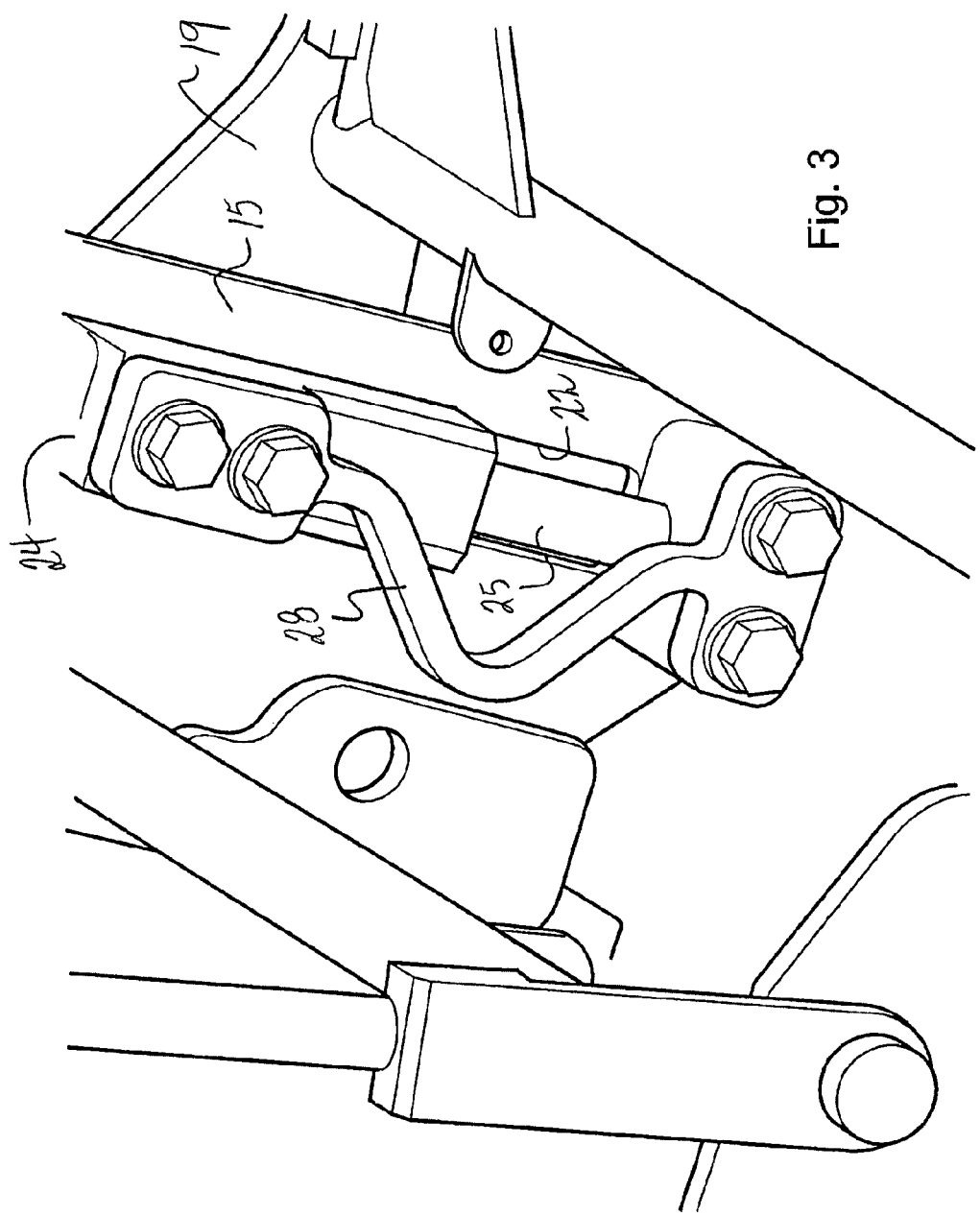
FIG. 3 is an enlarged fragmentary view illustrating various components of the seating assembly, including the displaceable mounting block, guide rod, EA link, and fixed mounting bracket.

In the exemplary embodiment shown, each displaceable mounting block 24 is slidably carried on a vertical guide rod 25, best shown in FIG. 3, and supported vertically by an energy attenuating (EA) metal seat link 28. The EA link 28 has a first end connected to the displaceable mounting block 24, and a second end connected to a base of the fixed mounting bracket 15. The exemplary EA link 28 may have a substantially sinusoidal design, and at least two fastener points at each end to prevent rotation. Each seat frame 11A, 11B of the seating assembly 10 may thus comprise two spaced-apart EA links 28 connected to respective displaceable mounting blocks 24 slidably carried on respective vertical guide rods 25. The seat assembly 10 may further comprise pivoted bases 31 (See FIG. 2) extending from respective pairs of pivoted base brackets 32, and connected to adjacent seat frames 11A, 11B by intermediate tie rods 33. Each tie rod 33 extends from a front of the seat frame 11A, 11B to a rear cross-arm 34 of the base 31, and serves to pivot the base 31 upon pivoting movement of the connected seat frame 11A, 11B.

Figure 6:
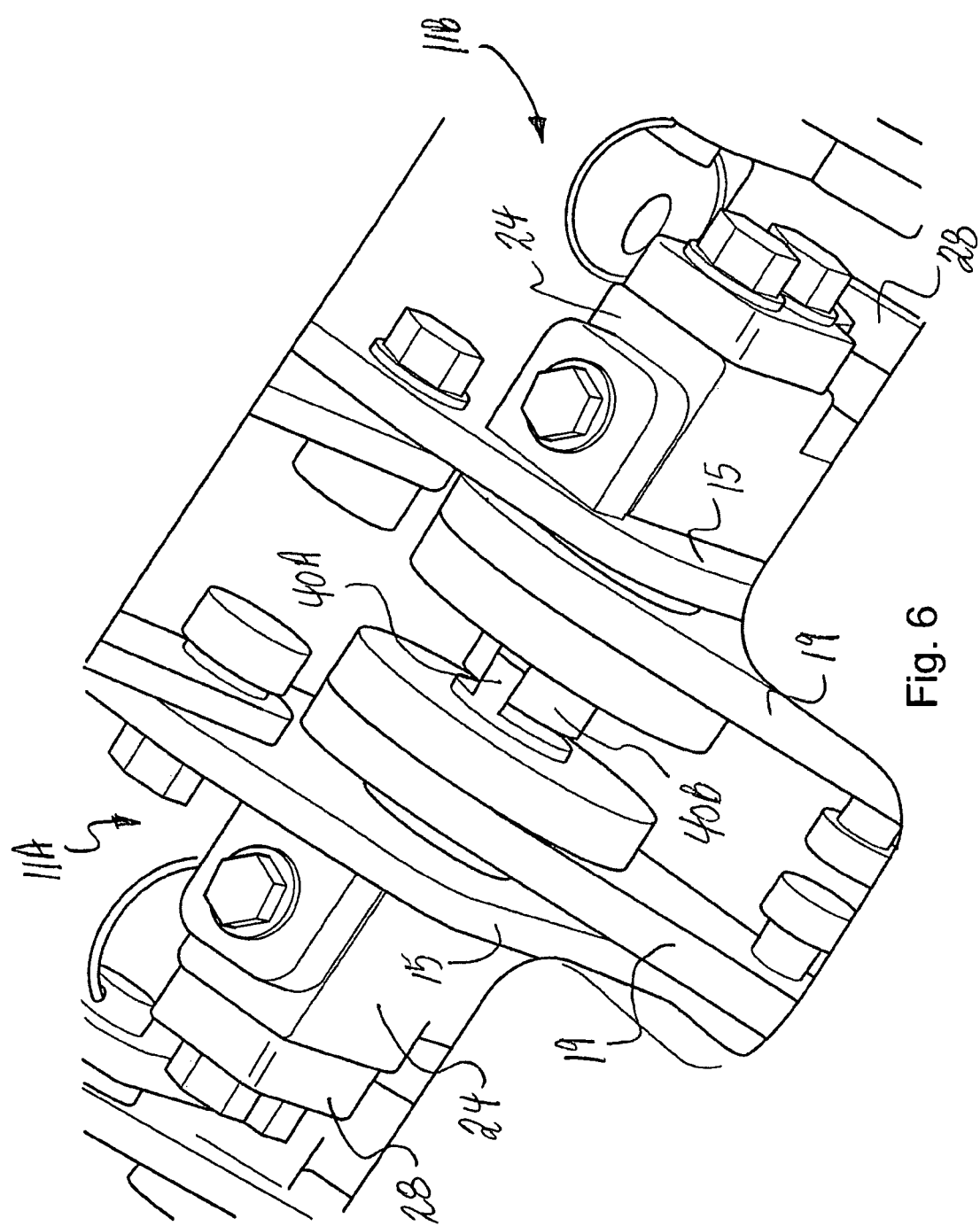
FIG. 6 is an enlarged fragmentary view illustrating additional components of the seating assembly, including the male and female seat connectors which function to operatively interlink the adjacent seat frames.
Figure 7:
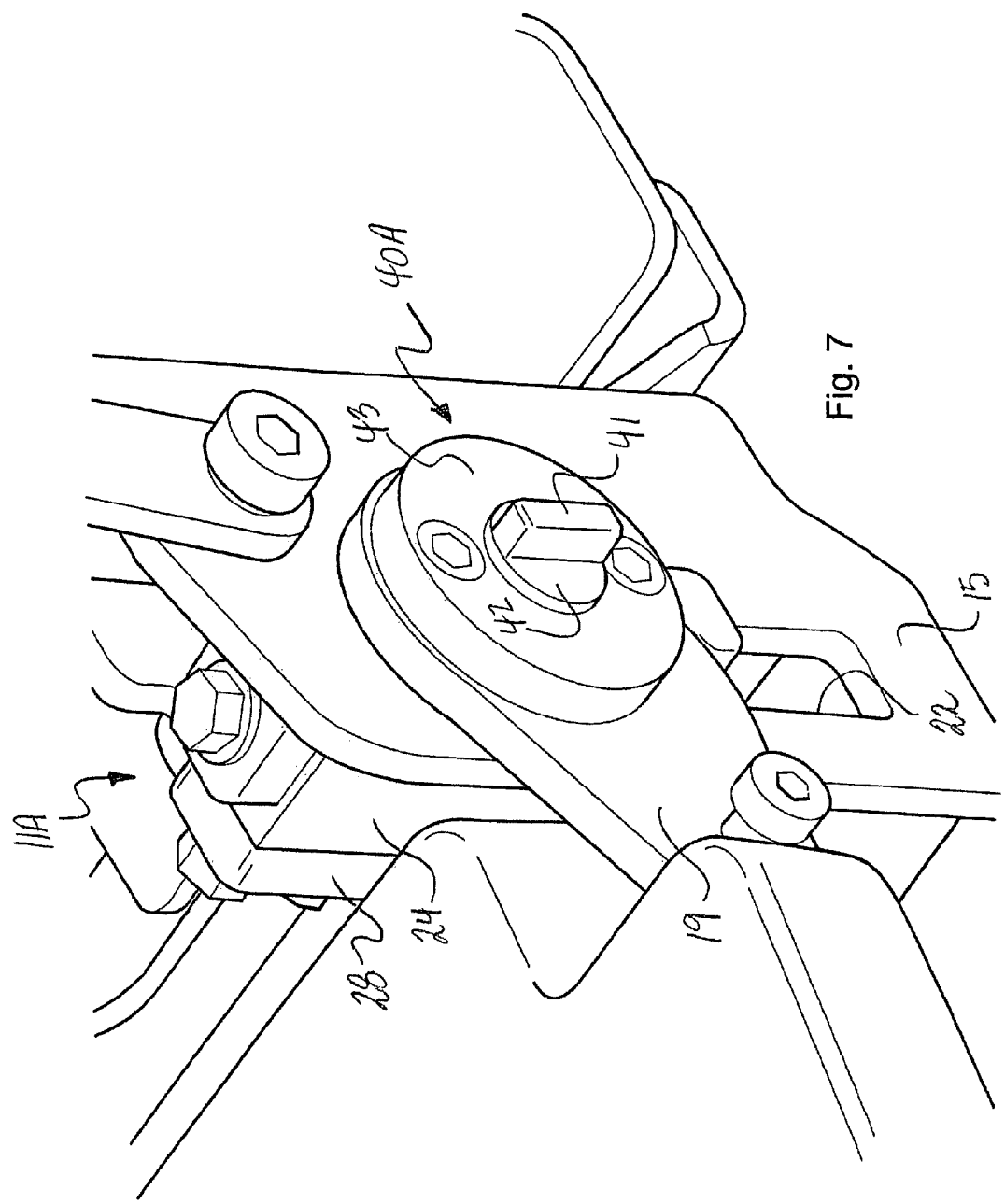
FIG. 7 is an enlarged fragmentary view illustrating the male seat connector.
Figure 8:
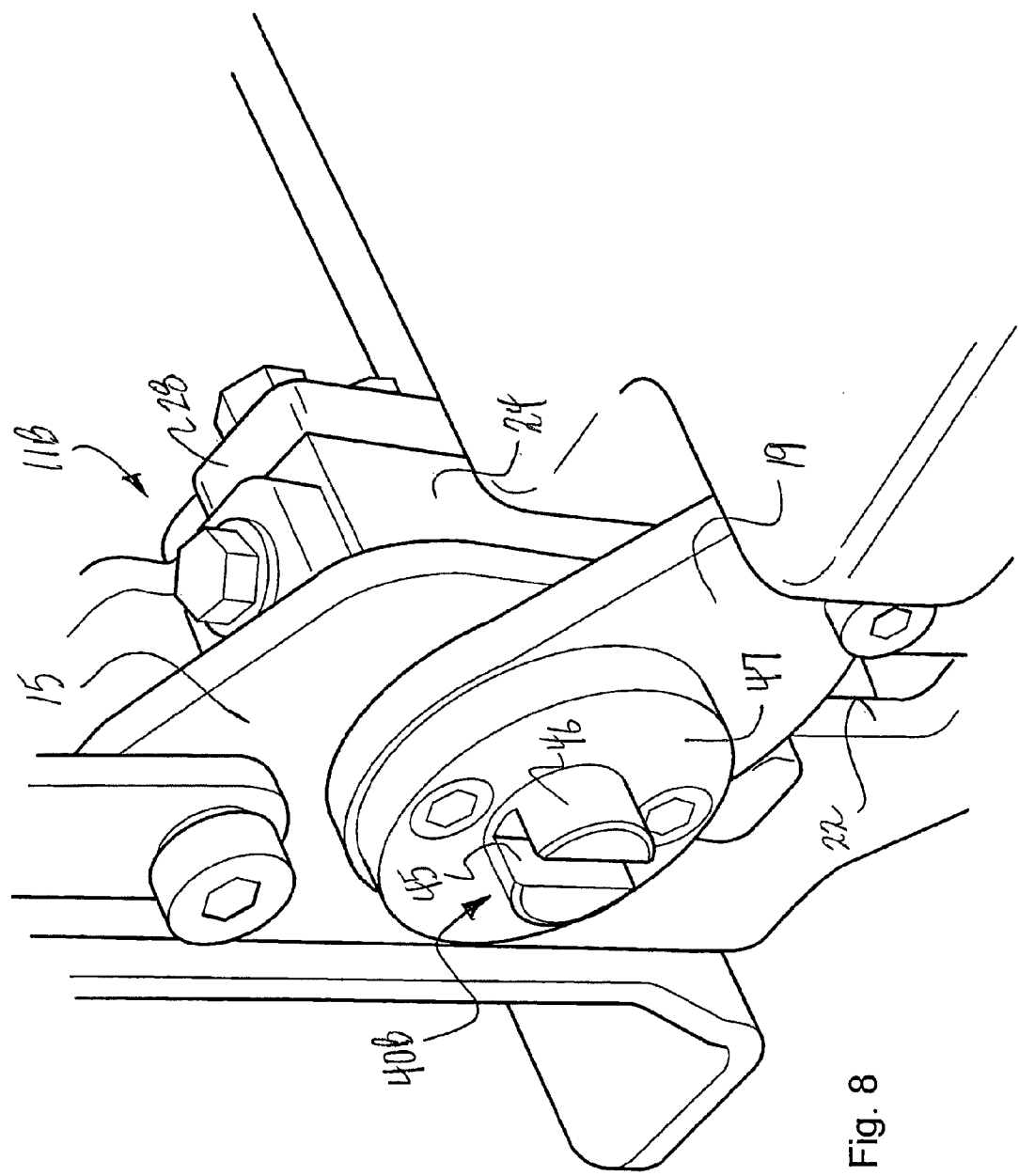
FIG. 8 is an enlarged fragmentary view illustrating the female seat connector.
Figure 9:
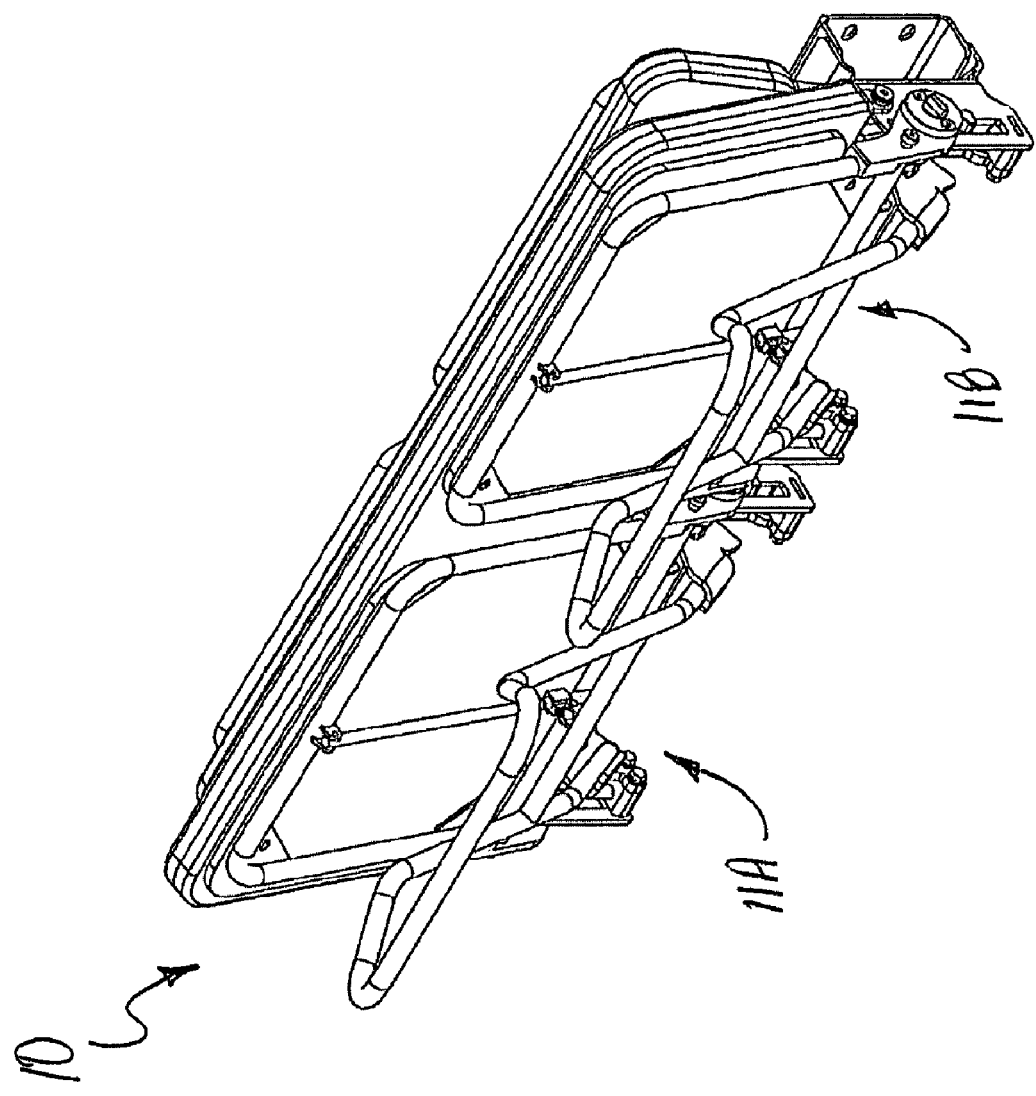
FIG. 9 is a perspective view of the exemplary seating assembly in a stowed (or upwardly folded) position.

As best shown in FIGS. 4-8, the adjacent seat frames 11A, 11B of seating assembly 10 have complementary male and female seat connectors 40A, 40B fixed to respective pivoted mounting arms 19, and arranged such that the male seat connector 40A of one seat frame 11A inserts into the female seat connector 40B of the adjacent seat frame 11B. In this manner, any number of seat frames 11A, 11B may be operatively interlinked and moved together in unison between a deployed position, shown in FIGS. 1 and 4, and a stowed position shown in FIG. 9. The exemplary male seat connector 40A, shown separately in FIG. 7, may comprise a generally rectangular-shaped projecting lug 41 integrally formed with a slightly raised disk 42, and centrally located within a circular mounting plate 43 fixedly bolted to the pivoted seat mounting arm 19. The exemplary female seat connector 40B, shown separately in FIG. 8, may comprise a complementary shaped open-end groove 45 formed with a raised disk 46, and centrally located within a circular mounting plate 47 fixedly bolted to the opposite mounting arm 19. The seat frames 11A, 11B are arranged side-by-side in the seating assembly 10 to mate complementary male and female seat connectors 40A, 40B, thereby interlinking the seat frames 11A, 11B and achieving bench seat functionality. In other words, when operatively linked as shown in FIGS. 4, 5 and 6, the array of seat frames 11A, 11B lifts upwardly together in unison into the stowed position shown in FIG. 9. Likewise, from the stowed position, the interlinked seats frames 11A, 11B fold downwardly together in unison to the deployed position shown (e.g.) in FIGS. 1 and 4. In the deployed position, the male and female seat connectors 40A, 40B are vertically oriented for free sliding vertical movement of one seat connector relative to the other, such that each interlinked seat frame 11A, 11B is allowed to stroke (i.e., move vertically) independent of the other based on different weights of adjacent occupants, or in the event an adjacent seat is unoccupied.

Figures 10, 11:
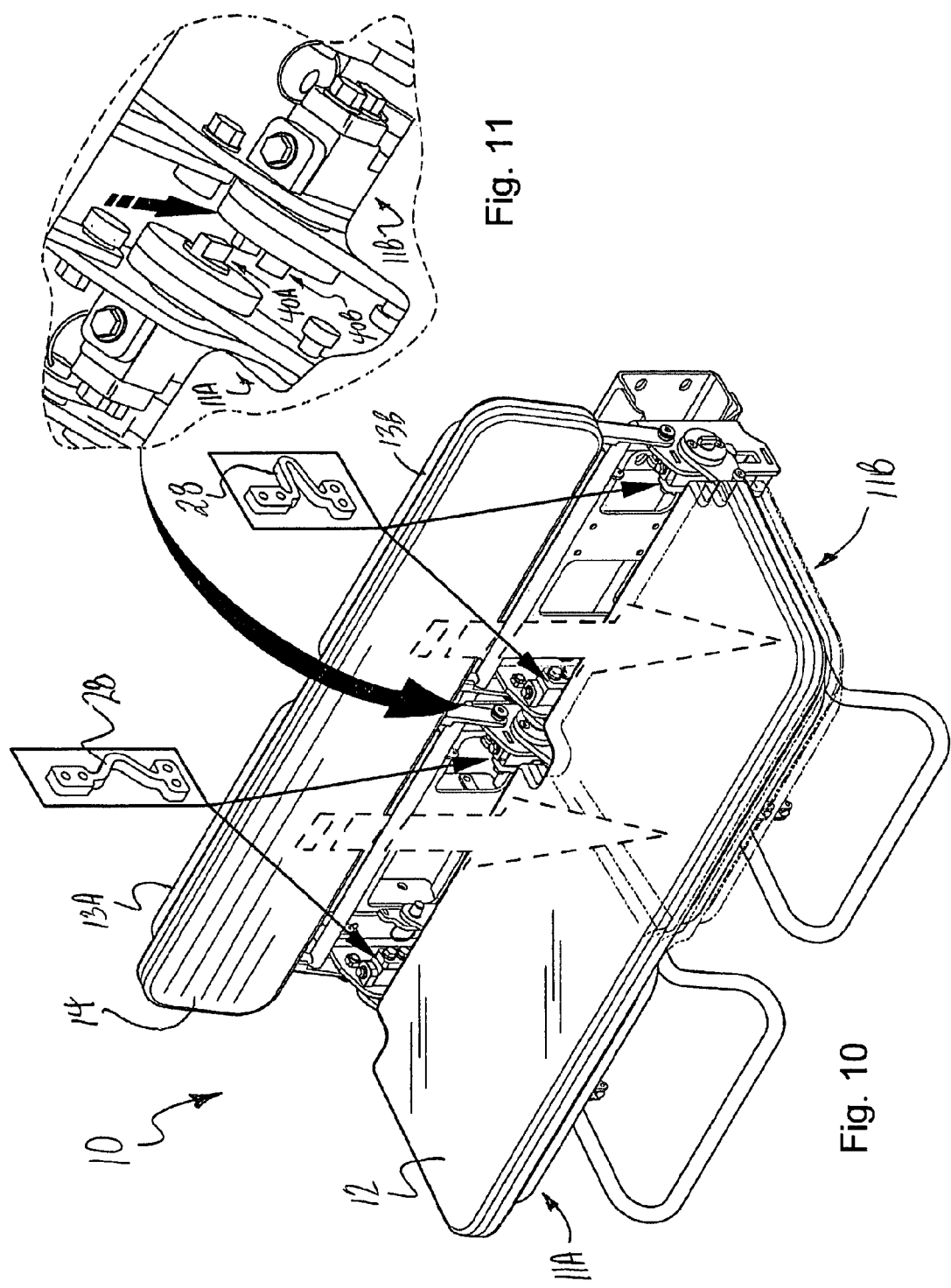
FIG. 10 is a further perspective view of the exemplary seating assembly demonstrating operation of the variable displacement seat frames.
FIG. 11 is an enlarged fragmentary view showing separation of the male and female connectors in a sudden impact scenario with different weight loads carried by each seat frame.

As demonstrated in FIGS. 10 and 11, in the event of a sudden impact (e.g., under-vehicle mine blast or slam-down), the seat frame 11B carrying the occupant (or heavier occupant) is allowed to independently stroke a greater distance along the vertical guide rods 25 (FIG. 3), and in an attenuated manner against the supporting force of the EA links 28. During vertical displacement, the vertically oriented male and female seat connectors 40A, 40B slide and separate, as shown in FIG. 11. The guide rods 25 control the bending direction of the EA links 28, and prevent twisting during vertical displacement. The exemplary EA links 28 are designed to substantially absorb the impact energy on the seat frame 11A, 11B, and may be custom tunable by modifying their material thickness, and/or shape. In one exemplary implementation, the present seat frames 11A, 11B may attenuate an impact of a 6.5 meters-per-second impulse due to mine blast or IED. The exemplary seating assembly 10 may also be capable of withstanding the following road shock loads transmitted through the vehicle chassis structure: 10 G's vertical, 8 G's longitudinal, and 5 G's transverse. In other exemplary embodiments, the seating assembly 10 may incorporate other or additional known energy attenuation links or devices. Although the EA links 28 may protect the occupant for multiple impact events, it is generally considered disposable and is easily replaced to restore a maximum level of protection to the seating assembly 10.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:
1. A variable displacement seating assembly, comprising:
a first pivotable seat frame comprising a male seat connector;
a second pivotable seat frame arranged adjacent said first seat frame, and comprising a female seat connector receiving the male seat connector of said first seat frame, whereby said first and second seat frames are operatively interconnected for simultaneous pivoting movement between a stowed position and a deployed position; and
wherein, in the deployed position of said first and second seat frames, said male and female seat connectors are disposed for sliding vertical movement of one seat connector relative to the other, such that said first and second seat frames are independently vertically displaceable upon an impact force acting against said seat assembly.

2. A variable displacement seating assembly according to claim 1, wherein said male seat connector comprises a projecting lug.

3. A variable displacement seating assembly according to claim 1, wherein said female connector comprises an open-ended groove.

4. A variable displacement seating assembly according to claim 1, and comprising a bench located over each of said first and second seat frames.

5. A variable displacement seating assembly according to claim 4, wherein said bench comprises a lateral flex joint in an area between said first and second seat frames.

6. A variable displacement seating assembly according to claim 1, wherein each of said first and second seat frames further comprises first and second spaced-apart fixed mounting brackets, a generally U-shaped seat support, and first and second pivoted mounting arms extending from respective mounting brackets and connected to respective free ends of said U-shaped seat support.

7. A variable displacement seating assembly according to claim 6, wherein each of said fixed mounting brackets defines a slotted vertical opening; and wherein each of said seat frames further comprises first and second displaceable mounting blocks carried on respective vertical guide rails, and received within said slotted openings of said mounting brackets; and wherein said first and second mounting arms of said seat frame are pivotably connected to said mounting blocks such that said mounting blocks enable vertical displacement of said seat frame along respective guide rails.

8. A variable displacement seating assembly according to claim 7, and comprising an energy attenuating seat link having a first end connected to said displaceable mounting block and a second end connected to a base of said fixed mounting bracket.

9. A variable displacement seating assembly according to claim 8, wherein said energy attenuating seat link comprises a substantially sinusoidal design.

10. A variable displacement seating assembly according to claim 1, and comprising a base located beneath each of said seat frames.

11. A variable displacement seating assembly according to claim 10, and comprising an intermediate pivoted tie bar extending from a front of each seat frame towards a rear of each base.

12. A variable displacement seating assembly according to claim 1, and comprising first and second fixed seat back frames located adjacent respective seat frames.

13. A variable displacement seating assembly according to claim 12, and comprising a seat back located over said fixed seat back frames.

14. A variable displacement seating assembly, comprising:
a first pivotable seat frame comprising a male seat connector;
a second pivotable seat frame arranged adjacent said first seat frame, and comprising a female seat connector receiving the male seat connector of said first seat frame, whereby said first and second seat frames are operatively interconnected for simultaneous pivoting movement between a stowed position and a deployed position;
wherein, in the deployed position of said first and second seat frames, said male and female seat connectors are disposed for sliding vertical movement of one seat connector relative to the other, such that said first and second seat frames are independently vertically displaceable upon an impact force acting against said seat assembly; and
means for attenuating an impact force acting against said seat assembly.

15. A variable displacement seating assembly according to claim 14, wherein said male connector comprises a projecting lug.

16. A variable displacement seating assembly according to claim 14, wherein said female connector comprises an open-ended groove.

17. A variable displacement seating assembly according to claim 14, and comprising a bench located over each of said first and second seat frames.

18. A variable displacement seating assembly according to claim 17, wherein said bench comprises a lateral flex joint in an area between said first and second seat frames.

19. A variable displacement seating assembly according to claim 14, wherein said means for attenuating comprises at least one energy attenuating seat link connected to at least one of said first and second seat frames.

20. A variable displacement seating assembly according to claim 19, wherein said energy attenuating seat link comprises a substantially sinusoidal design.

* * * * *